United States Patent
Barbier et al.

(10) Patent No.: US 12,358,091 B2
(45) Date of Patent: Jul. 15, 2025

(54) DEVICE FOR EXTRACTING DRILLING SLUDGE AND THE USE THEREOF

(71) Applicant: Hilti Aktiengesellschaft, Schaan (LI)

(72) Inventors: Lionel Barbier, Kaufering (DE); Stefan Franz, Augsburg (DE); Georg Holzmeier, Marktoffingen (DE); Matthias Mazur, Hamburg (DE); Paul Fally, Hamburg (DE); Eduard Sever, Ludesch (AT)

(73) Assignee: Hilti Aktiengesellschaft, Schaan (LI)

( * ) Notice: Subject to any disclaimer, the term of this patent is extended or adjusted under 35 U.S.C. 154(b) by 834 days.

(21) Appl. No.: 17/437,644

(22) PCT Filed: Mar. 11, 2020

(86) PCT No.: PCT/EP2020/056491
§ 371 (c)(1),
(2) Date: Sep. 9, 2021

(87) PCT Pub. No.: WO2020/187662
PCT Pub. Date: Sep. 24, 2020

(65) Prior Publication Data
US 2022/0176508 A1 Jun. 9, 2022

(30) Foreign Application Priority Data
Mar. 21, 2019 (EP) .................. 19164276

(51) Int. Cl.
 B23Q 11/00 (2006.01)
 B23Q 3/18 (2006.01)
 E21B 21/01 (2006.01)
 E21B 21/015 (2006.01)

(52) U.S. Cl.
 CPC .......... *B23Q 11/0046* (2013.01); *B23Q 3/183* (2013.01); *E21B 21/01* (2013.01); *E21B 21/011* (2020.05); *E21B 21/015* (2013.01)

(58) Field of Classification Search
 CPC ...... E21B 21/01; E21B 21/011; E21B 21/015; B23Q 11/0046
 See application file for complete search history.

(56) References Cited

U.S. PATENT DOCUMENTS

| 2,646,256 | A | * | 7/1953 | Lobbert | ................ E21B 21/015 |
| | | | | | 175/209 |
| 3,186,023 | A | | 6/1965 | McCulloch | |
| 4,018,483 | A | | 4/1977 | Smith | |

(Continued)

FOREIGN PATENT DOCUMENTS

| CN | 202461080 U | 10/2012 |
| JP | 9-192060 A | 7/1997 |

OTHER PUBLICATIONS

PCT/EP2020/056491, International Search Report dated Jul. 27, 2020 (Two (2) pages).

*Primary Examiner* — Bryan R Muller
(74) *Attorney, Agent, or Firm* — Crowell & Moring LLP (57) ABSTRACT

A device for extracting drilling sludge for use at difficult to access locations on a building site includes a main body. The main body has a cavity on a lower side of the main body and a drilling sludge that is disposed in the cavity during a use of the device is extractable from the cavity by a suction device. The main body also has an extraction opening which opens into the cavity.

12 Claims, 7 Drawing Sheets

(56) References Cited

U.S. PATENT DOCUMENTS

| | | | | |
|---|---|---|---|---|
| 4,184,226 A | * | 1/1980 | Loevenich | B23Q 11/0067 |
| | | | | 408/67 |
| 7,901,164 B2 | * | 3/2011 | Skradski | B23Q 11/0046 |
| | | | | 408/112 |
| 9,266,254 B2 | * | 2/2016 | Schneider | B28D 7/02 |
| 2010/0200216 A1 | * | 8/2010 | Webb | E21B 19/16 |
| | | | | 166/81.1 |

* cited by examiner

DEVICE FOR EXTRACTING DRILLING SLUDGE AND THE USE THEREOF

BACKGROUND AND SUMMARY OF THE INVENTION

The present invention relates to a device for extracting drilling sludge and to the use of the device. The extraction device has a main body, which, on the lower side thereof, has a cavity, which can be subjected to a vacuum, thus enabling the drilling sludge formed in the cavity to be extracted from the cavity by means of a suction device. The main body furthermore has an extraction opening, which opens into the cavity of the main body.

For core drilling in mineral underlying surfaces, use is generally made of a core drilling system in which water is supplied in order to achieve cooling of the core bit and flushing out of the drilling dust formed from the drill hole. The drilling sludge resulting therefrom, which in particular is a mixture of the drilling dust and the liquid supplied, is generally unwanted since its dispersal can lead to water damage. Such water damage is to be avoided, especially during renovation work in inhabited buildings. A number of solutions as regards the way in which the resulting drilling water or drilling sludge can be collected or extracted are known in the prior art. These systems are generally based on a type of water collector ring, which is intended to prevent the drilling water from dispersing in an uncontrolled manner. At the same time, it should be possible to extract the drilling water from the reservoir produced by the collector ring.

In some cases, there is a desire to carry out a core drilling at a point in the building at which a drywall is to be set up. Moreover, there may be a desire in the case of other uses to carry out core drillings in those regions of a building site at which it is not possible to use conventional extraction systems that are known from the prior art. Water collector rings are known extraction systems of this kind, for example. Examples of such uses in which conventional extraction systems cannot be used or cannot readily be used are drilling in a drywall rail or drilling on narrow edges, the geometrical circumstances and dimensions of which do not allow the installation or use of a water collector ring. In these cases too, however, the use of an extraction system would be desirable because, on the one hand, laying conduits and/or pipes in the drywall during subsequent work could be significantly simplified or, on the other hand, the mounting of railings on wall offsets could be made easier.

The drywall preferably comprises two panels, between which the conduits and/or pipes are to be laid. Drywalls are usually fixed to the floor by means of so-called floor or drywall rails. A (core) drilling is then carried out directly through the rail and the floor. To carry out core drilling work using cooling and/or flushing water, the conventional collector rings known from the prior art cannot be used since they cannot be configured and used in conjunction with the rigid floor rails. In particular, the known systems cannot be positioned within the floor rail. In practice, therefore, core drilling is often performed without collecting the water, and filling up of the drywall rail with drilling water—and subsequent water damage in the drywall—are accepted.

Suction nozzles which can be used in conjunction with a suction device in order to suck up dust or drilling sludge are also known in the prior art. A suction nozzle of this kind is known for example from U.S. Pat. No. 4,018,483 A. However, those from the prior art often have dimensions which precisely do not allow use in the floor rail of a drywall or on a narrow wall offset. Additional railings are likewise often mounted on wall offsets. The wall offsets are generally too narrow to enable a conventional water collector ring to be effectively installed, and therefore these often proved ineffective in practice.

Moreover, the systems known from the prior art have additional disadvantages since they are generally very expensive owing to the large number of individual parts required and often necessitate very laborious assembly at the desired location of use. This makes the handling of the conventional systems more difficult and disadvantageously reduces acceptance with users.

Some users resort to completely omitting the use of cooling water or flushing water and carry out core drillings without water, i.e., substantially "dry". However, carrying out core drillings dry leads to significantly higher wear on the core bit and considerably shortens the service life thereof.

The object underlying the present invention consists in overcoming the above-described disadvantages of the prior art and providing an extraction device which can be used at locations on a building site which can be accessed only with difficulty by conventional extraction systems. In particular, the intention is to provide an extraction device which can be used in conjunction with a floor rail of a drywall or on wall offsets, for example. At the same time, the extraction device to be provided should allow efficient extraction of the drilling sludge out of a floor rail and, for example, also allow extraction on narrow offsets. The extraction device to be provided should be simple to use and should be capable of being produced as inexpensively as possible. In particular, the invention should allow the user to carry out core drillings cleanly with water in drywall rails and on wall offsets. In addition, it would be desirable if the device to be provided could be assembled quickly and with little effort at the desired location of use while, at the same time, giving rise to low usage costs for the construction company or the developer.

The object is achieved by the subject matter of the independent claims. Advantageous embodiments of the subject matter of the independent claims can be found in the dependent claims.

According to the invention, a device for extracting drilling sludge for use at difficult to access locations on a building site is provided. These difficult to access locations, at which, in particular, it is not possible to use conventional extraction devices, such as water collector holders, can be floor rails of drywalls or wall offsets or narrow concrete edges, for example. The extraction device is characterized in that the device has a main body, wherein the main body has, on a lower side, a cavity, which can be subjected to a vacuum, thus enabling the drilling sludge formed in the cavity to be extracted from the cavity by means of a suction device, wherein the main body furthermore has an extraction opening, which opens into the cavity on the lower side of the main body. According to the invention, the device is also referred to, in particular, as an extraction device and can advantageously be used as a floor nozzle for sucking up wet or moist drilling sludge.

According to the invention, it is preferred that the extraction device can be connected to a suction device via the extraction opening. For this purpose, the upper region of the extraction opening can be connected to a suction hose of a suction device. The extraction opening can thus preferably be connected to a suction device. According to the invention, it is particularly preferred that the suction device is a "wet vacuum cleaner" or a water management system, which is often used in conjunction with core drills. Wet vacuum cleaners are preferably designed, in particular, to pick up and/or suck up wet or moist drilling sludge. For example, it is also possible to use a combined wet and dry vacuum cleaner for sucking up the preferably moist drilling sludge. The vacuum to which the cavity of the main body can be subjected can preferably be produced by means of the suction device, wherein the vacuum can be passed by means of the suction hose through the extraction opening into the cavity of the suction device.

According to the invention, it is preferred that, in the case of use, i.e., when the suction device is used, the cavity forms with the floor rail of the drywall a closed suction space, from which the drilling sludge can be extracted. The closed extraction space is, in particular, of airtight design, wherein the sealing of the closed volume preferably withstands a certain vacuum or tolerates a certain vacuum without the sealing failing. If the extraction device is positioned in the floor rail of the drywall or on a wall offset, the lower side of the closed extraction space or cavity is preferably formed by the floor rail or a wall upper edge. The cavity is preferably formed by a recess in the main body of the extraction device, the recess first of all being open downward, i.e., on the lower side. By means of the insertion of the extraction device, the cavity is closed and preferably becomes the closed extraction space, which is subjected to a vacuum and from which the drilling sludge can be extracted. In a first step, the vacuum in the cavity preferably ensures that the extraction device adheres to the bottom of the rail by suction, as a result of which sealing is brought about and the closed extraction space is formed. In particular, the bottom surface or base area of the main body is thereby sealed.

The extraction opening preferably forms a substantially cylindrical opening or hole within the main body. In a very particularly preferred embodiment of the invention, the extraction opening can be of conical design. Improved sealing between the suction hose end, which is usually likewise of conical design, and the device is thereby advantageously ensured. The extraction opening is, in particular, designed as a through hole or opening, which opens into the cavity on the lower side of the main body. The extraction opening can be connected to a suction device at its upper end. This can preferably be accomplished by means of a suction hose of the suction device. The vacuum which is produced by means of the suction device can be passed into the cavity of the main body of the extraction device with the aid of the suction hose. The extraction opening preferably has smooth inner walls to ensure that the drilling sludge does not adhere to any edges or irregularities.

According to the invention, it is preferred that the extraction opening be of sloping design in relation to a substantially flat lower side of the extraction device. The lower side of the extraction device preferably defines a plane with which a virtual axis, which is preferably arranged centrally within the extraction opening, encloses a slope angle. The slope angle can preferably be in a range of from 0 to 90 degrees, preferably 10 to 80 degrees.

The slope of the extraction opening is helpful when the extraction device is being used in conjunction with a core drill and a wet vacuum cleaner or a water management system since the different devices could otherwise be in the way of each other or hinder each other, making the handling of the devices together more difficult. By virtue of the slope of the extraction opening, the suction hose of the suction device or water management system leaves the extraction device at an angle and therefore points away from the core drill bit, which is substantially perpendicular to the lower side of the extraction device. By virtue of the slope of the virtual central axis, the extraction opening preferably faces in the direction of a rear or back side of the extraction device.

In one exemplary embodiment of the invention, it is preferred that the extraction device has a main body, wherein the main body has, on a lower side, a cavity, which, when the extraction device is used, forms a closed extraction space with the floor rail of the drywall, wherein the closed extraction space can be subjected to a vacuum in such a way that the drilling sludge formed in the cavity can be extracted from the extraction space by means of a suction device, wherein the main body furthermore has an extraction opening for connecting the device to a suction device, wherein the extraction opening opens into the cavity on the lower side of the main body.

Before the start of drilling, the extraction device can preferably be inserted with a precise fit into the drywall rail. On the bottom side, the provided extraction device has a cavity, which is formed between the drywall rail and the device and which forms a vacuum when a wet vacuum cleaner or a water management system is connected to the opening provided for that purpose. In addition, the upper side of the main body of the extraction device is configured in such a way that the user can use this surface as a hold-down surface. This prevents unwanted detachment, especially at the start of the drilling process.

For use on wall offsets, one exemplary embodiment of the invention can have additional geometrically shaped lugs, which are designed to act as fixing points for the drilling rigs used. It is thereby possible to guarantee particularly reliable positioning of the extraction device, even if the device is not used in a drywall rail. In addition, the lugs can also effectively prevent the extraction device from slipping even when the vacuum in the extraction space is not sufficient to fix the device.

The geometrically shaped lugs can be recesses which are suitable for fixing the extraction device in the direction of the underlying surface. The lugs can furthermore be designed as pockets. In particular, the lugs are designed to receive available clamps of an existing fixing system, thus achieving fastening. The recesses can be delimited laterally by a web, wherein the web preferably does not protect beyond the remaining outer surface of the device.

Figure 4:
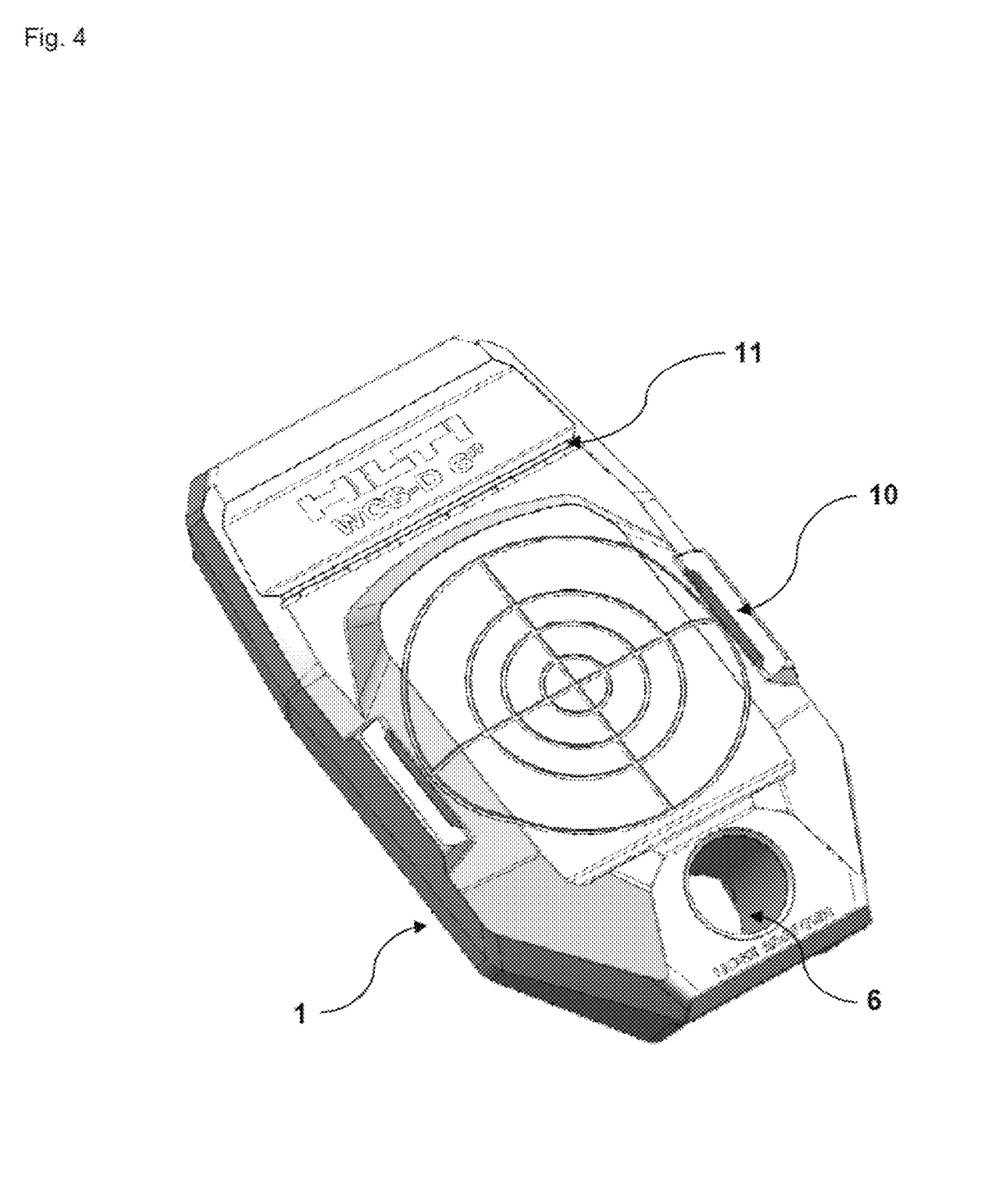
FIG. 4 shows a view of a preferred configuration of the extraction device with markings and lugs.

Moreover, an exemplary embodiment of the invention can have a marking visible to the user for shortening the device to enable it to be positioned as close as possible to the drilling rig. It is thereby possible to considerably simplify the assembly of the overall system since it is advantageously possible to work without spacers. In other words, the device can have markings by means of which a length of the device can be adapted to geometrical circumstances or dimensions of the location at which the core drillings are to be carried out. The lugs and markings are illustrated in FIG. 4, for example.

The extraction device is preferably manufactured from a solid foam. In other words, it is preferred according to the invention that the main body of the extraction device comprises a preferably hard foam or is formed therefrom. This makes it possible to produce the extraction device at particularly low cost by mass production methods. Moreover, the extraction device made of foam obtained in this way has a low weight and can be carried easily on a building site. According to the invention, it is preferred that the foam is a foamed polypropylene (PP) or a thermoplastic. According to the invention, it is preferred that it should be possible to drill through the foam cleanly and easily without it fraying at the edges or breaking during initial drilling. Moreover, provision is made to use a foam which advantageously does not absorb the water contained in the drilling sludge. In other words, the foam provided for the device is not of absorbent design.

According to the invention, it is preferred that a centering aid for positioning the core drill is arranged on an upper side of the main body. The centering aid can be similar in design to a target, wherein, in particular, a central point of the centering aid is arranged centrally on the upper side of the main body. In this context, the term "centrally" refers especially to a central position between the side faces of the provided extraction device. The centering aid is preferably designed to align the drill bit of a core drill in such a way that it drills through the floor rail of the drywall and the underlying surface situated underneath centrally with respect to the floor rail. The drill hole formed is thus preferably substantially at equal distances from the side faces of the extraction device. The centering aid can furthermore comprise concentric circles, which can indicate the optimum drilling position for different drill bit diameters. The concentric circles preferably each correspond to a certain standardized drill bit diameter. The drill bit of a core drill is preferably positioned on the upper side of the main body in such a way that the drill bit is placed on in a central region of the centering aid. The upper side of the main body is preferably of substantially flat design in the region of the centering aid. The drill bit of the core drill is preferably placed on the main body substantially perpendicularly to this flat upper side of the extraction device, with the result that the drilling operation advantageously takes place perpendicularly to the upper surface or surface of the floor rail. Just before drilling of the drywall rail starts, the water supply to the core drill bit can be switched on. The water which accumulates can advantageously be extracted through the extraction opening.

An additional advantage of the provided extraction device is that the opening produced by the core drill preferably has the same diameter as the drill bit used. This is advantageous because it gives rise, between the core drill bit and the extraction device, to a sealing surface at which preferably no drilling water can escape. The drilling water which accumulates during the drilling operation is extracted in a particularly effective manner through the extraction opening. The extraction device is preferably configured in such a way that it can be used multiple times for the same or increasing drilling diameters. As a result, it is, in particular, reusable, and therefore it is also advantageously possible to contribute to protection of the environment by means of the invention.

According to the invention, it is preferred that the extraction device has recesses, which are preferably designed as hand grips, and which enable the user of the extraction device to release the main body of the extraction device from the floor or from the floor rail in a particularly simple manner. The recesses are advantageous particularly when a vacuum, by means of which the main body is sucked firmly against the floor rail, has formed in the cavity of the main body. If the user reaches into one of the recesses—e.g., with one finger—and raises the main body slightly, the vacuum in the closed extraction space collapses, and the suction effect between the extraction device and the floor rail is ended. This makes it significantly easier to remove the extraction device from the floor rail. According to the invention, it is preferred that the main body of the extraction device has at least one recess. This can preferably be arranged on a front side or a rear side. The extraction device can preferably also have two or more recesses, wherein the recesses are preferably present on the front side and/or the rear side of the main body because they are more easily accessible there for the user.

In another embodiment of the invention, it is preferred that the main body has, on the lower side thereof, at least one recess for easier removal of the device from the floor rail of the drywall. The main body can preferably have two such recesses, wherein a first recess can be provided in the front region and a second recess can be provided in the rear region of the main body. The terms "front" and "rear" are not unclear terms for a person skilled in the art in the context of the present invention since the rear region is preferably the region of the main body which has the extraction opening. The preferably sloping extraction opening preferably also faces in the direction of the user. The front region of the main body has, on an upper side, a substantially flat surface, which can be used as a hold-down surface, for example. The hold-down surface preferably forms a surface on the upper side of the extraction device which can be used to fix the extraction device in the floor rail of the drywall by pressing the main body in the direction of the floor rail. This hold-down function can also be achieved, for example, by placing a heavy object on the substantially flat surface in order to make the extraction device heavier.

The main body has a substantially cuboidal, three-dimensional basic shape. The bottom surface of the main body, which preferably forms the lower side of the cuboid, preferably has a substantially rectangular base area. The side faces of the main body preferably adjoin the longer rectangle sides of the preferably rectangular base area of the bottom surface of the main body, while the front side and the rear side of the main body adjoin the shorter rectangle sides of the preferably rectangular base area of the bottom surface of the main body. The side faces preferably rest in a form-fitting manner against the inner walls of the floor rail of the drywall, wherein, in particular, airtight sealing between the side faces of the main body and the inner surfaces of the drywall rail is effected. In other words, the main body preferably has dimensions such that a sealing effect is produced between the side faces of the main body and the floor rail of the drywall.

According to the invention, it is preferred that the drywall rails are standardized. Dedicated extraction devices can preferably be provided for different sizes of drywall rail. The sizes 3⅝" or 6" are conceivable, for example, without restriction thereto. The sizes correspond to 9.20 cm and 15.24 cm, respectively, for example, and preferably represent the width of the extraction device. With such a preferred width in a range of from 5 to 25 cm, particularly preferably in a range of from 9 to 16 cm and most preferably 9.20 cm or 15.24 cm, the provided extraction nozzle is distinct from the prior art, which often discloses bottom nozzles that are too wide to be used in the floor rail of a drywall or on a narrow wall offset, for example. According to the invention, it is very particularly preferred that the width of the provided extraction device can be matched to the geometrical circumstances and dimensions of the location at which the core drilling is to be carried out. If, for example, the extraction device is to be used in a floor rail of a drywall, it may be preferred according to the invention that the width of the extraction device corresponds to the width of the floor rail. According to the invention, this can mean, in particular, that the width of the device and an internal width of the floor rail are substantially the same or similar. A distance between the side faces of the floor rail can preferably be somewhat greater than the width of the extraction device, and therefore the device can be inserted into the floor rail or removed therefrom particularly easily.

The width of the extraction device preferably represents the distance between the substantially parallel side faces of the main body. According to the invention, it is particularly preferred that the side faces of the main body interact with side faces of the floor rail of the drywall in such a way that an airtight seal is formed. The device or the main body thereof can preferably be positioned in such a way that it can be inserted into the floor rail of a drywall before the start of drilling. The dimensions of the device or of the main body, in particular the width thereof, therefore preferably correspond to the width of the floor rail of the drywall. According to the invention, the term "correspond" preferably means that the dimensions of the main body are matched to the dimensions of the floor rail of the drywall in such a way that the main body can be inserted into the floor rail and forms a seal with the side faces of the floor rail, especially when there is liquid or drilling sludge in the floor rail.

According to the invention, it is preferred that a configuration of the cavity in the interior of the provided extraction nozzle can be optimized in respect of its bottom surface. According to the invention, this preferably means that the base area of the cavity is maximized in relation to the cavity volume, with the result that it preferably accounts for a large proportion of the bottom surface of the provided extraction nozzle. The cavity can preferably form a maximized downward-facing surface. Such maximization of the surface brings about an optimum "suction force". In a preferred configuration of the invention, the cavity can have a substantially circular base area. By virtue of the preferred generous rounding or rounding off of the edges in the cavity, it is advantageously the case that no difficult-to-clean corners are formed, in which the drilling sludge sticks and can only be removed with difficulty. In particular, the preferably substantially edge- and corner-free configuration of the base area of the cavity facilitates subsequent cleaning of the extraction device, thus enabling the device to be frequently reused in a particularly simple manner.

In another embodiment of the invention, it may be preferred that the cavity comprises a large proportion of the bottom surface of the device and that the boundary lines substantially follow the course of the lateral edges of the device. A base area of the cavity can preferably have any desired shape, wherein it is preferred according to the invention that the cavity has a volume which is as large as possible in relation to the bottom surface of the device. This enables a larger surface to be subjected to a vacuum, thus enabling the airtight sealing of the cavity or of the closed extraction volume to be improved. If the base area of the cavity has corners, it is preferred according to the invention that the corners comprise large, preferably obtuse angles between 90 and 180 degrees.

In a second aspect, the invention relates to the use of the provided extraction device to extract drilling sludge from a floor rail of a drywall. The terms, definitions and technical advantages introduced for the extraction device preferably apply in analogous fashion to the use of the extraction device.

Further advantages will become apparent from the following description of the figures. The figures, the description and the claims contain numerous features in combination. A person skilled in the art will expediently also consider the features individually and combine them to form expedient further combinations.

In the figures, identical components and components of identical type are designated by the same reference signs.

DETAILED DESCRIPTION OF THE DRAWINGS

Figure 1:
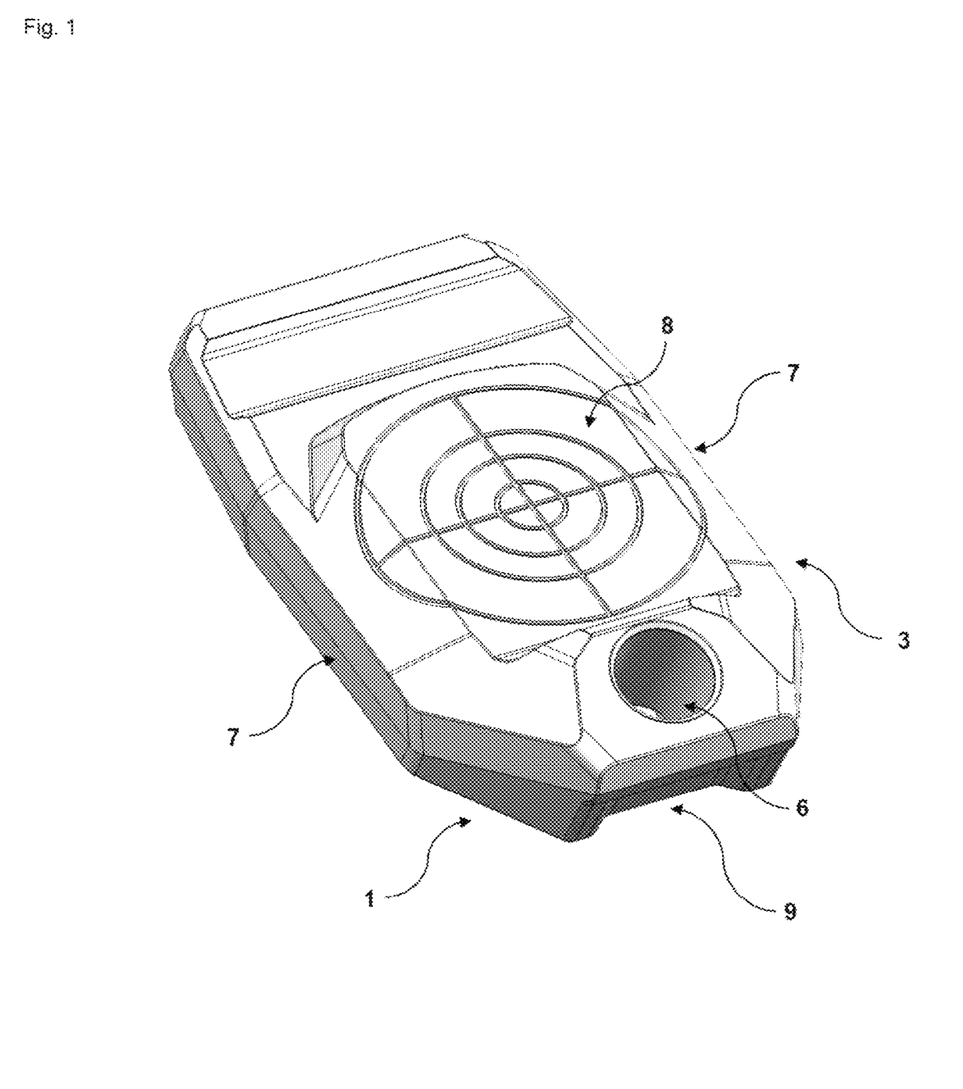
FIG. 1 shows a view of a preferred configuration of the invention.

FIG. 1 shows a preferred configuration of a provided extraction device (1). The main body (3) of the extraction device (1), which is preferably formed by a cuboidal piece of foam, is illustrated. The main body (3) has an extraction opening (6), which can be connected to a suction device (not illustrated). A suction hose of the suction device, for example, can be introduced into the extraction opening (6). A vacuum, which is produced by the suction device, can preferably be passed into a cavity (5) of the main body (3) by means of the suction hose. The cavity (5) of the main body (3) is preferably situated on a lower side (4) of the extraction device (1). Recesses (9), by means of which removal of the extraction device (1) from a floor rail (2) of a drywall can be made easier by breaking the vacuum in the cavity (5) of the main body (3), can be provided in the preferably narrower front and/or rear side of the extraction device (1). The longer sides of the main body (3) preferably form the side faces (7) of the extraction device (1). These side faces (7) can advantageously interact with inner surfaces of the drywall rail (2) in such a way that the vacuum on the lower side (4) of the extraction device (1) and in the cavity (5) is such that drilling sludge can be extracted from the cavity (5) by means of the vacuum of the suction device. The side faces (7) of the main body (3) preferably seal off the inner walls of the floor rail (2) of the drywall.

A centering aid (8) for the placement of the core drill can be provided on an upper surface of the main body (3). The centering aid (8) is preferably designed to find an optimum central position of the core drill bit between the walls of the floor rail (2) of the drywall. For this purpose, the centering aid (8) preferably comprises a central point which is at equal distances from the side faces (7) of the extraction device (1), and concentric rings, which are arranged around the central point of the centering aid (8). The embodiment of the invention illustrated in FIG. 1 can have a width of between 15 and 16 cm, for example. The width of the extraction device (1) can preferably be matched to the width of the drywall rail (2).

Figure 2:
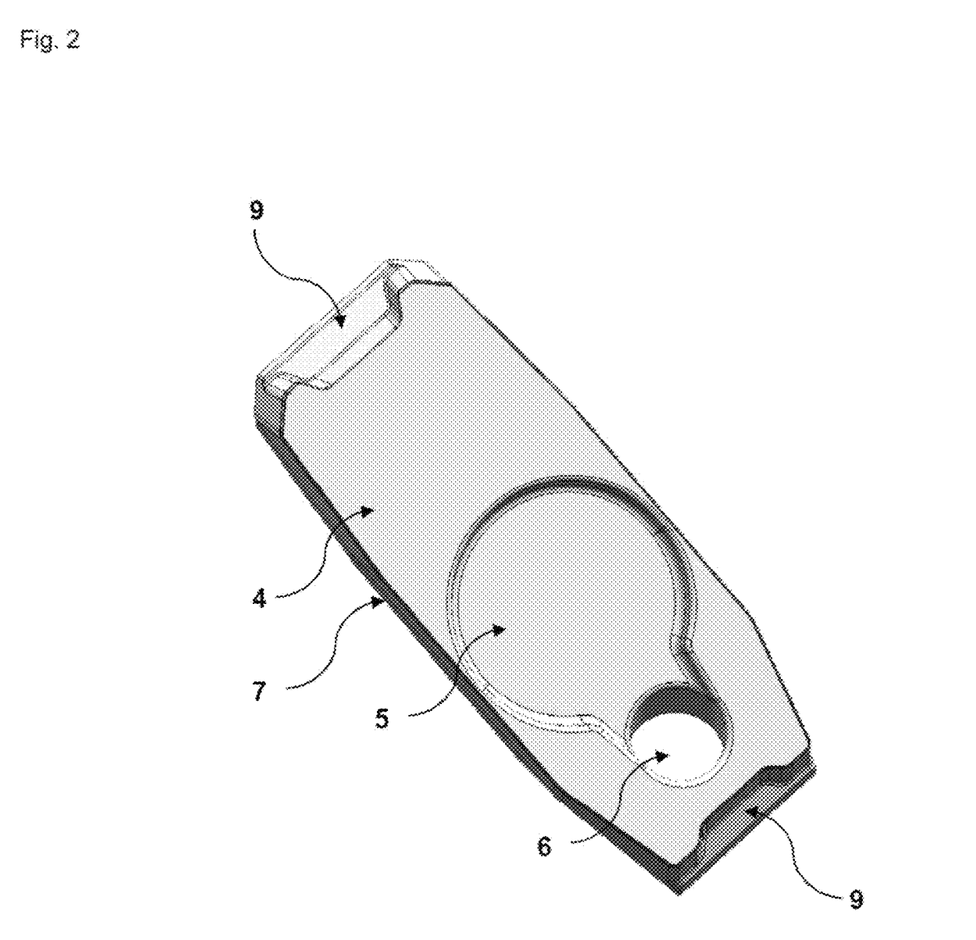
FIG. 2 shows a view of a lower side of a preferred configuration of the invention.

FIG. 2 shows a lower side (4) of a preferred configuration of the extraction device (1). The lower side (4) is preferably of flat design. It has a recess, which preferably has a circular base area. Differently shaped base areas for the cavity (5) are also conceivable. The proportion of the surface which forms the cavity (5) is preferably as large as possible relative to the total base area of the device (1), wherein a stability of the walls produced by the cavity (5) within the device (1) is preferably not negatively affected. This recess forms a cavity (5), the lower side of which is formed by the floor rail (2) of a drywall when the extraction device (1) is inserted into such a drywall rail (2). By means of the vacuum of the suction device to which the extraction device (1) can be connected via the extraction opening (6), the extraction device (1) is sucked against the floor rail (2), with the result that a closed extraction volume is formed, from which drilling sludge can be sucked. The cavity (5) is preferably connected to the extraction opening (6), thus enabling the vacuum of the suction device to enter the cavity (5) of the main body (3) through the extraction opening (6). Open recesses (9), by means of which the removal of the device (1) from the floor rail (2) can be made easier, can be arranged on the lower side (4) of the main body (3).

Figure 3:
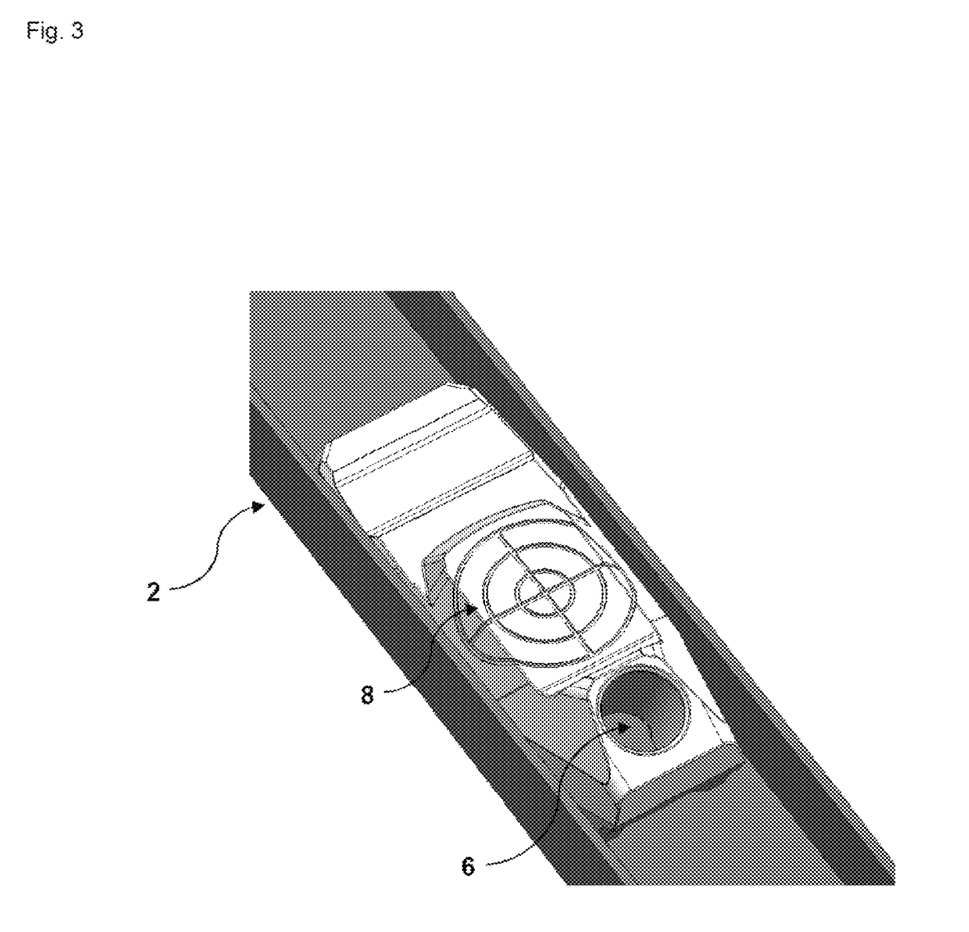
FIG. 3 shows a view of a preferred configuration of the extraction device, which is inserted into a drywall rail.

FIG. 3 shows a view of a preferred configuration of the extraction device (1), which is inserted into a drywall rail (2). The side faces (7) of the extraction device (1) preferably end in a form-fitting manner with inner walls of the floor rail (2), resulting in sealing between the main body (3) of the extraction device (1) and the floor rail (2). The recess (9), the centering aid (8) and the extraction opening (6) of the extraction device (1) can furthermore be seen in FIG. 3. The embodiment of the extraction device (1) illustrated in FIG. 3 can have a width of between 9 and 10 cm, for example.

FIG. 4 shows a preferred embodiment of the provided extraction device (1) with markings (11) and lugs (10). As illustrated in FIG. 4, the lugs (10) can be arranged on the side faces (7) of the device (1), in particular in an upper region, i.e., on an upper side of the extraction device (1). The lugs (10) can be used to connect the extraction nozzle (1) to a drilling rig, on which a core drill can be secured. According to the invention, it is preferred that the provided extraction device (1) has two lugs (10), which can preferably be arranged symmetrically on the side edges of the extraction device (1). The lugs (10) are preferably arranged at the level of the centering aid (8). It is thereby advantageously possible to facilitate the centering of the core drill and drilling at a «correct» point on the underlying surface.

In addition to the lugs (10), the extraction device (1) can have markings (11). The markings (11) can be used to shorten the device (1) if spatial preconditions encountered or specified require it. For example, the region beyond the marking (11) can be separated from the rest of the device (1), e.g., by being snapped off or sawn off. It is thereby possible to further reduce the space which must be available when using the provided extraction nozzle, as a result of which the scope of use of the invention is advantageously enlarged. The markings (11) can be optical markings that can be perceived optically by the user of the invention. However, they can also be raised portions or depressions that are accessible to haptic perception. Depressions, in particular, have proven particularly suitable markings because, in this case, snapping off the region of the device (1) beyond these can be made even easier. The embodiment of the extraction device (1) illustrated in FIG. 4 can have a width of between 15 and 16 cm, for example.

Figure 5:
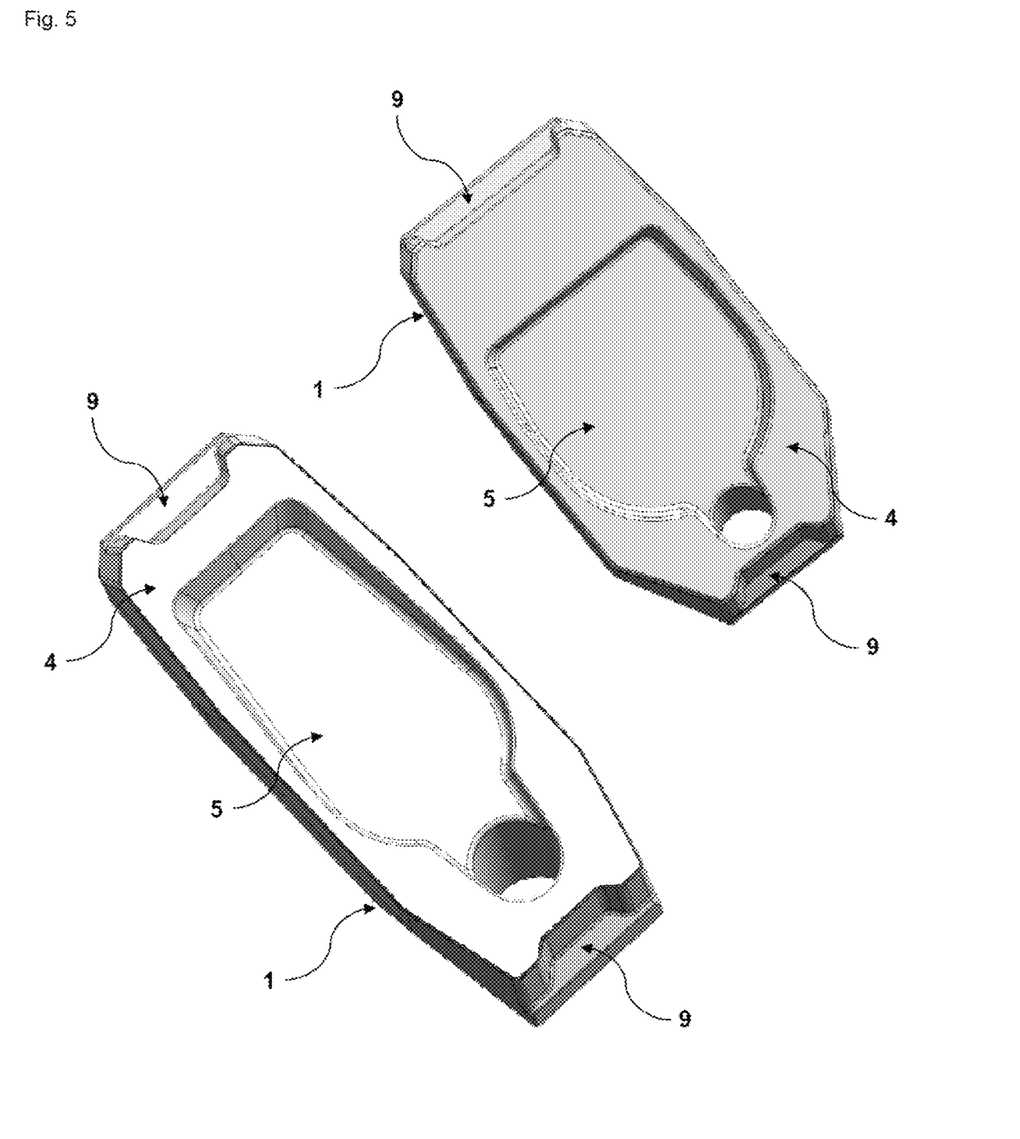
FIG. 5 shows views of lower sides of preferred configurations of the invention.

FIG. 5 shows views of lower sides (4) of preferred configurations of the invention (1). In particular, FIG. 5 shows possible configurations of the cavities (5) situated on the lower sides (4) of the main bodies (3) of the extraction devices (1). According to the invention, it is preferred that the volume of the cavity (5) in the interior of the provided extraction nozzle (1) can be optimized in respect of the bottom surface of the device (1). According to the invention, this preferably means that the base area of the cavity (5) is made as large as possible in relation to the cavity volume, with the result that the open base area of the cavity (5) preferably accounts for a large proportion of the bottom surface or lower side (4) of the provided extraction nozzle (1). In other words, the cavity (5) can form a maximized downward-facing surface. By virtue of the particularly large open base area of the cavity (5), it is advantageously possible to achieve an optimum "suction force", thus enabling drilling sludge to be sucked up in a particularly effective manner by means of the invention. For example, the open base area of the cavity (5) in the exemplary embodiment at the bottom left in the image is larger in relation to the total bottom surface (4) of the main body (3) or device (1) than in the exemplary embodiment at the top right in the image. In other words, the ratio of the open base area of the cavity (5) to the total bottom surface (4) of the device (1) is greater in the exemplary embodiment at the bottom left in FIG. 5 than in the exemplary embodiment at the top right in FIG. 5.

Figure 6:
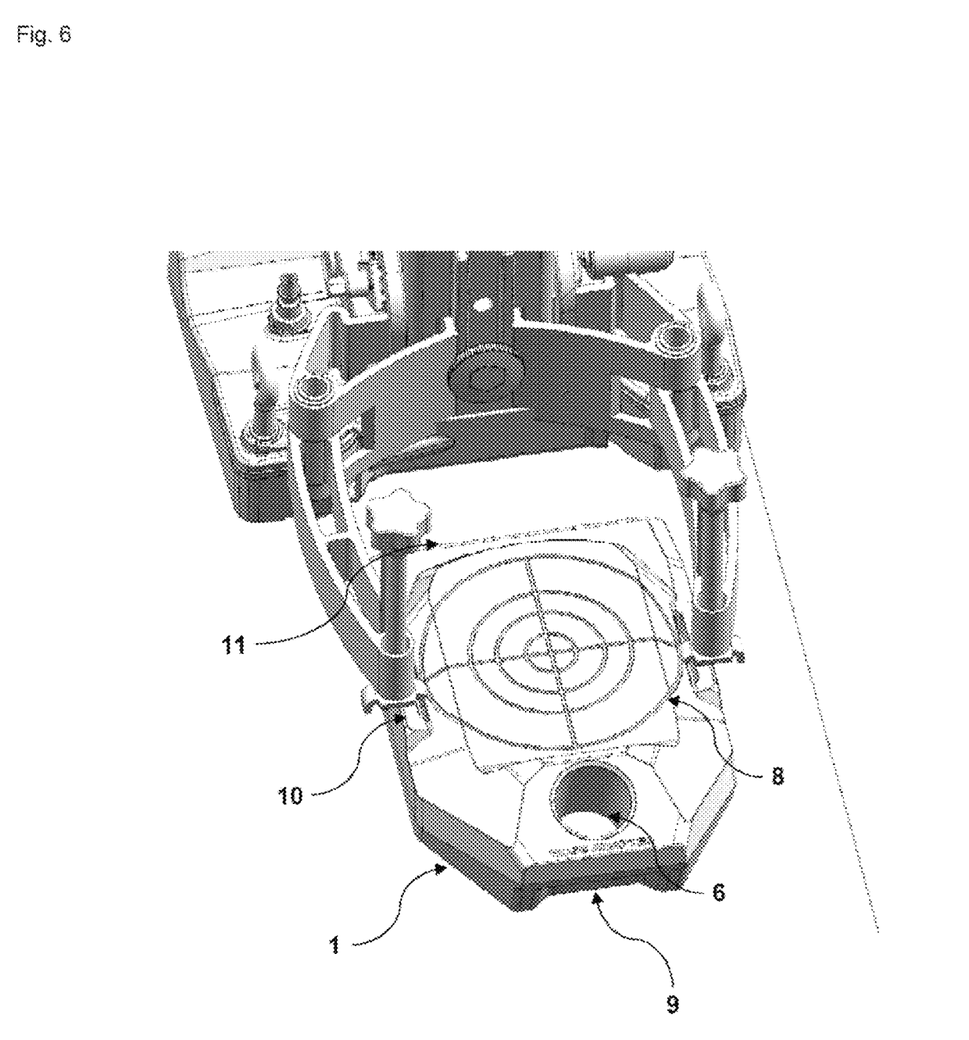
FIG. 6 shows a view of a preferred configuration of the extraction device, which is being used together with a drilling rig.

FIG. 6 shows a view of a preferred configuration of an extraction device (1), which is being used together with a drilling rig. The drilling rig is designed to hold a core drill and can be connected to the extraction device (1) with the aid of the lugs (10). In contrast to the device (1) illustrated in FIG. 4, the extraction device (1) illustrated in FIG. 6 is shortened. That is to say that it ends at the marking (11), which can be used to shorten the extraction device (1). That region of the extraction device (1) which goes beyond the marking (11) has been removed in the case of the device (1) illustrated in FIG. 6, and therefore the shortened extraction device (1) can interact in a particularly simple and uncomplicated manner with the drilling rig.

Figure 7:
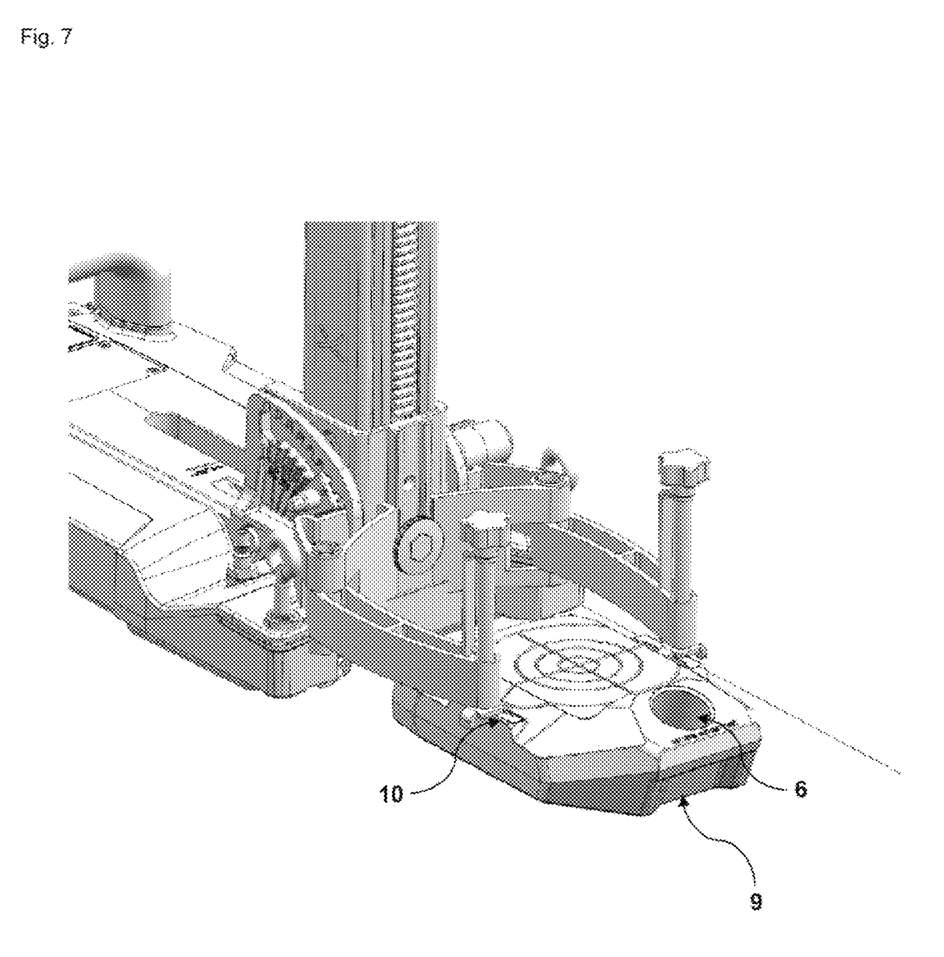
FIG. 7 shows another view of a preferred configuration of the extraction device, which is being used together with a drilling rig.

FIG. 7 shows another view of a preferred configuration of the extraction device (1), which is being used together with a drilling rig. In the case of the exemplary embodiment of the invention illustrated in FIG. 7 too, the suction device (1) is connected to a drilling rig with the aid of the lugs (10).

LIST OF REFERENCE CHARACTERS 1 device or extraction device
2 floor rail
3 main body
4 lower side of the main body
5 cavity
6 extraction opening
7 side faces of the main body
8 centering aid
9 recess
10 lugs
11 marking for shortening the extraction device

What is claimed is:
1. A device for extracting drilling sludge for use at difficult to access locations on a building site, comprising:
   a main body;
   wherein the main body has a cavity on a lower side of the main body, wherein the cavity is formed by a first recess defined by the main body, wherein the first recess is open on a lower side of the main body and the first recess is closed on an upper side of the first recess by a base area of the main body;
   wherein the main body has an extraction opening which is positioned at an outer lateral edge of the cavity, opens into a lateral side of the cavity, and passes through top and bottom surfaces of the main body laterally offset from the first recess;

wherein the remainder of the main body does not include any openings through the top surface or base area of the main body that open vertically into the first recess; and wherein a drilling sludge that is disposed in the cavity during a use of the device is extractable from the cavity by a suction device connected to the extraction opening.

2. The device as claimed in claim 1, wherein the main body is a foam.

3. The device as claimed in claim 1, wherein a first portion of the lower side of the main body includes the base area and wherein a second portion of the lower side of the main body does not include the base area.

4. The device as claimed in claim 1, wherein the base area is circular.

5. The device as claimed in claim 1, wherein the lower side of the main body is flat and wherein the extraction opening slopes in relation to the lower side.

6. The device as claimed in claim 1, wherein a centering aid is disposed on an upper side of the main body.

7. The device as claimed in claim 1 further comprising lugs disposed on respective sides of the device.

8. The device as claimed in claim 1, wherein the device has a width in a range of from 5 to 25 cm.

9. The device as claimed in claim 1 further comprising a marking on the device.

10. The device as claimed in claim 1, wherein the main body has side faces and wherein the main body has a dimension such that a sealing effect is produced between the side faces of the main body and a floor rail of a drywall during the use of the device.

11. The device as claimed in claim 10, wherein the main body has a second recess on the lower side of the main body.

12. The device as claimed in claim 1,
wherein a centering aid for placement of a core drill is disposed on the top surface of the main body;
wherein the centering aid disposed on the top surface of the main body is in a form of a target and comprises a central point which is at equal distances from side faces of the main body and concentric circles which are disposed around the central point of the centering aid on the top surface of the main body and which each correspond to a respective standardized drill bit diameter.

* * * * *